US011878509B2

(12) United States Patent
Mizuta et al.

(10) Patent No.: US 11,878,509 B2
(45) Date of Patent: Jan. 23, 2024

(54) LIQUID EJECTING APPARATUS, INSPECTION METHOD, AND STORAGE MEDIUM

(71) Applicant: Seiko Epson Corporation, Tokyo (JP)

(72) Inventors: Shohei Mizuta, Matsumoto (JP); Toshiro Murayama, Fujimi-machi (JP)

(73) Assignee: Seiko Epson Corporation, Tokyo (JP)

(*) Notice: Subject to any disclaimer, the term of this patent is extended or adjusted under 35 U.S.C. 154(b) by 202 days.

(21) Appl. No.: 17/648,853

(22) Filed: Jan. 25, 2022

(65) Prior Publication Data

US 2022/0234345 A1 Jul. 28, 2022

(30) Foreign Application Priority Data

Jan. 28, 2021 (JP) ................................ 2021-011755

(51) Int. Cl.
*B41J 2/045* (2006.01)

(52) U.S. Cl.
CPC ......... *B41J 2/0451* (2013.01); *B41J 2/04573* (2013.01); *B41J 2/04581* (2013.01); *B41J 2/04588* (2013.01)

(58) Field of Classification Search
CPC .. B41J 2/04508; B41J 2/0451; B41J 2/04558; B41J 2/04561; B41J 2/04573; B41J 2/04581; B41J 2/04588; B41J 2/2135; B41J 2/2139; B41J 2/2142; B41J 2/2146
See application file for complete search history.

(56) References Cited

U.S. PATENT DOCUMENTS

2007/0013731 A1 1/2007 Tatsumi et al.

FOREIGN PATENT DOCUMENTS

JP 2007-021807 2/2007

*Primary Examiner* — Anh T Vo
(74) *Attorney, Agent, or Firm* — WORKMAN NYDEGGER

(57) ABSTRACT

The position information includes first position information about a position, at a first timing, of a droplet ejected from a first nozzle, which is one of the plurality of nozzles, and traveling in air, and second position information about a position, at the first timing, of a droplet ejected from a second nozzle, which is one of the plurality of nozzles N and is different from the first nozzle, and traveling in air.

17 Claims, 5 Drawing Sheets

LIQUID EJECTING APPARATUS, INSPECTION METHOD, AND STORAGE MEDIUM

The present application is based on, and claims priority from JP Application Serial Number 2021-011755, filed Jan. 28, 2021, the disclosure of which is hereby incorporated by reference herein in its entirety.

BACKGROUND

1. Technical Field

Embodiments of the present disclosure relate to a liquid ejecting apparatus, an inspection method, and a non-transitory computer-readable storage medium storing an inspection program.

2. Related Art

In general, a liquid ejecting apparatus, a typical example of which is an ink-jet printer, is equipped with a liquid ejecting head that ejects a liquid such as ink in the form of droplets. The position where a droplet ejected from a liquid ejecting head lands on to a medium, which is the target of printing, sometimes deviates from a desired position due to a manufacturing error or the like, resulting in a decrease in image quality. In related art, for example, as disclosed in JP-A-2007-021807, a deviation in the landing position, on a reference plane, of a droplet ejected from each nozzle is measured.

In the method disclosed in JP-A-2007-021807, a test pattern is printed on the recording surface of a medium that serves as a reference, and, based on the result of printing, the amount of deviation in landing position is calculated.

In the method disclosed in JP-A-2007-021807, the deviation in landing position is merely measured for each nozzle and, therefore, it is impossible to tell whether the deviation in landing position is unique to a certain particular nozzle or is common to a plurality of nozzles. For this reason, when the deviation in landing position is common to the plurality of nozzles, complex processing such as controlling ejection from each nozzle individually is performed for the purpose of correcting the deviation in landing position, despite the fact that a simple method of adjusting the mount state of the liquid ejecting head suffices for the correction. Consequently, in related art, the processing load of a system will be heavy, and it is impossible to correct the deviation in landing position accurately.

SUMMARY

A liquid ejecting apparatus according to a certain aspect of the present disclosure includes: a liquid ejecting head in which a plurality of nozzles for ejecting a liquid as droplets are arranged; a first acquisition unit that acquires position information about positions of droplets ejected from the plurality of nozzles and traveling in air; and a second acquisition unit that acquires, based on the position information, deviation information about a deviation in droplet landing position from a reference position on a reference plane, for droplets ejected from at least two nozzles among the plurality of nozzles; wherein the position information includes first position information about a position, at a first timing, of a droplet ejected from a first nozzle, which is one of the plurality of nozzles, and traveling in air, and second position information about a position, at the first timing, of a droplet ejected from a second nozzle, which is one of the plurality of nozzles N and is different from the first nozzle, and traveling in air.

Another aspect of the present disclosure is an inspection method for inspecting a liquid ejecting head in which a plurality of nozzles for ejecting a liquid as droplets are arranged, comprising: a first acquisition step of acquiring, as position information about positions of droplets ejected from the plurality of nozzles and traveling in air, first position information about a position, at a first timing, of a droplet ejected from a first nozzle, which is one of the plurality of nozzles, and traveling in air, and second position information about a position, at the first timing, of a droplet ejected from a second nozzle, which is one of the plurality of nozzles N and is different from the first nozzle, and traveling in air; and a second acquisition step of acquiring, based on the position information, deviation information about a deviation in droplet landing position from a reference position on a reference plane, for droplets ejected from at least two nozzles among the plurality of nozzles.

Another aspect of the present disclosure is a non-transitory computer-readable storage medium storing an inspection program for inspecting a liquid ejecting head in which a plurality of nozzles for ejecting a liquid as droplets are arranged, the inspection program causing a computer to execute functions comprising: a first acquisition function of acquiring, as position information about positions of droplets ejected from the plurality of nozzles and traveling in air, first position information about a position, at a first timing, of a droplet ejected from a first nozzle, which is one of the plurality of nozzles, and traveling in air, and second position information about a position, at the first timing, of a droplet ejected from a second nozzle, which is one of the plurality of nozzles N and is different from the first nozzle, and traveling in air; and a second acquisition function of acquiring, based on the position information, deviation information about a deviation in droplet landing position from a reference position on a reference plane, for droplets ejected from at least two nozzles among the plurality of nozzles.

DESCRIPTION OF EXEMPLARY EMBODIMENTS

Figure 1:
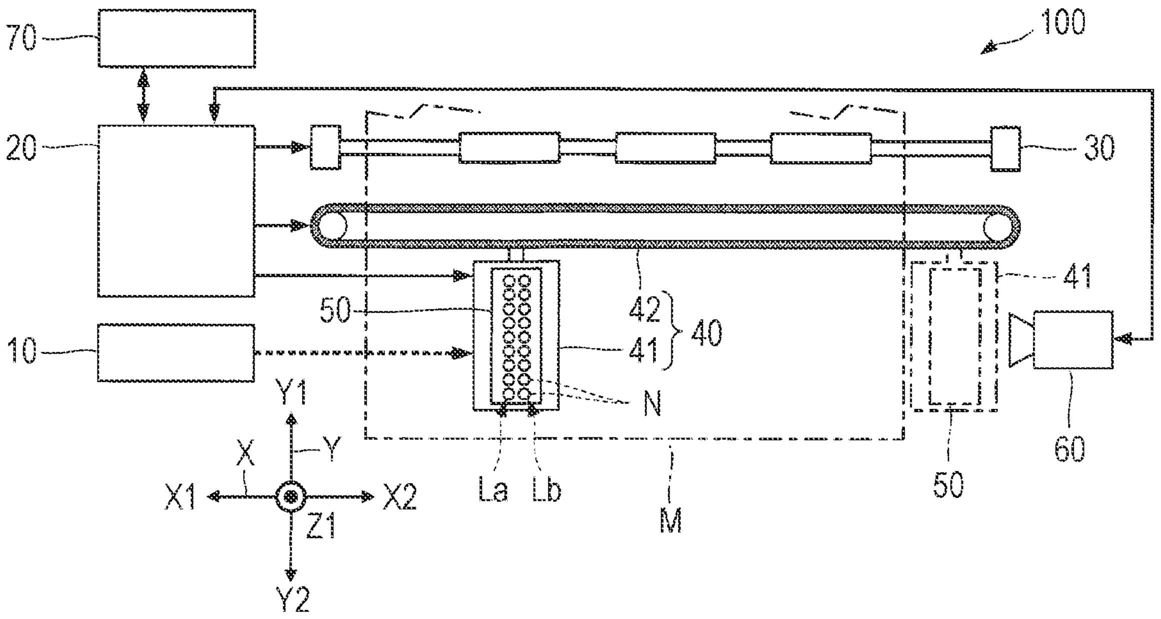
FIG. 1 is a schematic view of the configuration of a liquid ejecting apparatus according to a first embodiment.

With reference to the accompanying drawings, some preferred embodiments of the present disclosure will now be described. The dimensions and scales of components illustrated in the drawings may be different from actual dimensions and scales, and some components may be schematically illustrated for easier understanding. The scope of the present disclosure shall not be construed to be limited to these specific examples unless and except where the description below contains an explicit mention of limiting the present disclosure.

To facilitate the readers' understanding, the description below will be given with reference to X, Y, and Z axes intersecting with one another. In the description below, one direction along the X axis will be referred to as the X1 direction, and the direction that is the opposite of the X1 direction will be referred to as the X2 direction. Similarly, directions that are the opposite of each other along the Y axis will be referred to as the Y1 direction and the Y2 direction. Directions that are the opposite of each other along the Z axis will be referred to as the Z1 direction and the Z2 direction. View in the direction along the Z axis may be referred to as "plan view".

Typically, the Z axis is a vertical axis, and the Z2 direction corresponds to a vertically downward direction. However, the Z axis does not necessarily have to be a vertical axis. The X, Y, and Z axes are typically orthogonal to one another, but are not limited thereto. It is sufficient as long as the X, Y, and Z axes intersect with one another within an angular range of, for example, 80° or greater and 100° or less.

1. First Embodiment

1-1. Overall Configuration of Liquid Ejecting Apparatus

FIG. 1 is a schematic view of the configuration of a liquid ejecting apparatus 100 according to a first embodiment. The liquid ejecting apparatus 100 is an ink-jet-type printing apparatus that ejects droplets of ink, which is an example of a liquid, onto a medium M. A typical example of the medium M is printing paper. The medium M is not limited to printing paper. The medium M may be a print target made of any material such as, for example, a resin film or a cloth.

As illustrated in FIG. 1, a liquid container 10 that contains ink is attached to the liquid ejecting apparatus 100. Some specific examples of the liquid container 10 are: a cartridge that can be detachably attached to the liquid ejecting apparatus 100, a bag-type ink pack made of a flexible film material, an ink tank which can be refilled with ink, etc. Any type of ink may be contained in the liquid container 10.

The liquid ejecting apparatus 100 includes a control unit 20, a transport mechanism 30, a movement mechanism 40, a liquid ejecting head 50, an imaging device 60, which is an example of "an imaging unit", and a display device 70, which is an example of "a notification unit".

The control unit 20 is a computer that controls the operation of each component of the liquid ejecting apparatus 100. The control unit 20 includes a processing circuit, for example, a CPU (central processing unit) or an FPGA (field programmable gate array), and a storage circuit such as a semiconductor memory. The control unit 20 will be described in detail later with reference to FIG. 2.

The transport mechanism 30 transports the medium M in the Y2 direction under the control of the control unit 20. The movement mechanism 40 reciprocates the liquid ejecting head 50 in the X1 direction and the X2 direction under the control of the control unit 20. In the example illustrated in FIG. 1, the movement mechanism 40 includes a carriage 41, which has a shape like a box and houses the liquid ejecting head 50, and a transportation belt 42, to which the carriage 41 is fixed. The carriage 41 is an example of "a mounting unit". In the illustrated example, the number of the liquid ejecting head 50 mounted on the carriage 41 is one, but not limited thereto. Two or more liquid ejecting heads 50 may be mounted. In addition to the liquid ejecting head(s) 50, the liquid container(s) 10 mentioned above may be mounted on the carriage 41.

Under the control of the control unit 20, the liquid ejecting head 50 ejects, in the form of droplets from each of a plurality of nozzles N toward the medium M in the Z2 direction, ink supplied from the liquid container 10. The droplet ejection is performed in parallel with the transportation of the medium M by the transport mechanism 30 and with the reciprocation of the liquid ejecting head 50 by the movement mechanism 40. As a result of this concurrent execution of the droplet ejection, the medium transportation, and the head reciprocation, an image is formed by ink on the surface of the medium M.

In the present embodiment, the nozzles N of the liquid ejecting head 50 are arranged in the direction along the Y axis. In the example illustrated in FIG. 2, the plurality of nozzles N is made up of a row La and a row Lb, which are arranged next to each other, with an interval in the direction along the X axis therebetween. Each of the row La and the row Lb is a group of nozzles N arranged linearly in the direction along the Y axis. The number of the nozzles N of the liquid ejecting head 50 is not limited. Either the row La or the row Lb may be omitted.

Though not illustrated, the liquid ejecting head 50 includes a plurality of cavities each of which is provided individually for the corresponding one of the plurality of nozzles N, a plurality of piezoelectric elements each of which is provided individually for the corresponding one of the plurality of nozzles N, and a drive circuit configured to supply drive pulses to the plurality of piezoelectric elements. Each of the plurality of cavities contains ink. The plurality of piezoelectric elements mentioned here corresponds to a plurality of piezoelectric elements 51 illustrated in FIG. 2, which will be described later. Receiving the drive pulse supplied from the drive circuit, each of the plurality of piezoelectric elements changes the internal pressure of the corresponding cavity, and, as a result of this pressure change, ink is ejected from the nozzle N corresponding to the cavity. The drive circuit mentioned here corresponds to a drive circuit 52 illustrated in FIG. 2, which will be described later.

The liquid ejecting head 50 having the structure described above can be manufactured by, for example, preparing a plurality of substrates such as silicon substrates that have been treated by etching, etc., and then bonding these substrates together by means of an adhesive. The piezoelectric elements are obtained by, for example, forming an electrode material and a piezoelectric material into films. Instead of the piezoelectric element, a heater that heats ink inside the cavity may be used as a driving element for ejecting ink from the nozzle N.

The imaging device 60 is a camera configured to, under the control of the control unit 20, capture an image of a droplet that has been ejected from the liquid ejecting head 50 and is traveling in air. The imaging device 60 includes, for example, an imaging optical system and an imaging element. The imaging optical system is an optical system that includes at least one imaging lens. The imaging optical system may include various kinds of optical element such as a prism. The imaging optical system may include a zoom lens or a focus lens, etc. The imaging element is, for example, a CCD (Charge Coupled Device) image sensor, a CMOS (Complementary MOS) image sensor, or the like.

In the present embodiment, the imaging device 60 is provided at a position on the X2-directional side with respect to the area of movement of the liquid ejecting head 50 by the movement mechanism 40. In the present embodiment, the imaging device 60 captures, in the X1 direction, an image of a droplet having been ejected from the liquid ejecting head 50 located at the position shown by alternate-long-and-two-short-dashes-line illustration in FIG. 1. A more detailed explanation of the capturing of an image of a droplet by the imaging device 60 will be given later.

The display device 70 is a device that performs various kinds of display under the control of the control unit 20. More specifically, the display device 70 displays various kinds of information, for example, information for performing printing by the liquid ejecting apparatus 100. For example, the display device 70 is a device that includes any of various kinds of display panel such as a liquid crystal display panel, an organic EL (electro-luminescence) display panel, or the like.

1-2. Electric Configuration of Liquid Ejecting Apparatus

Figure 2:
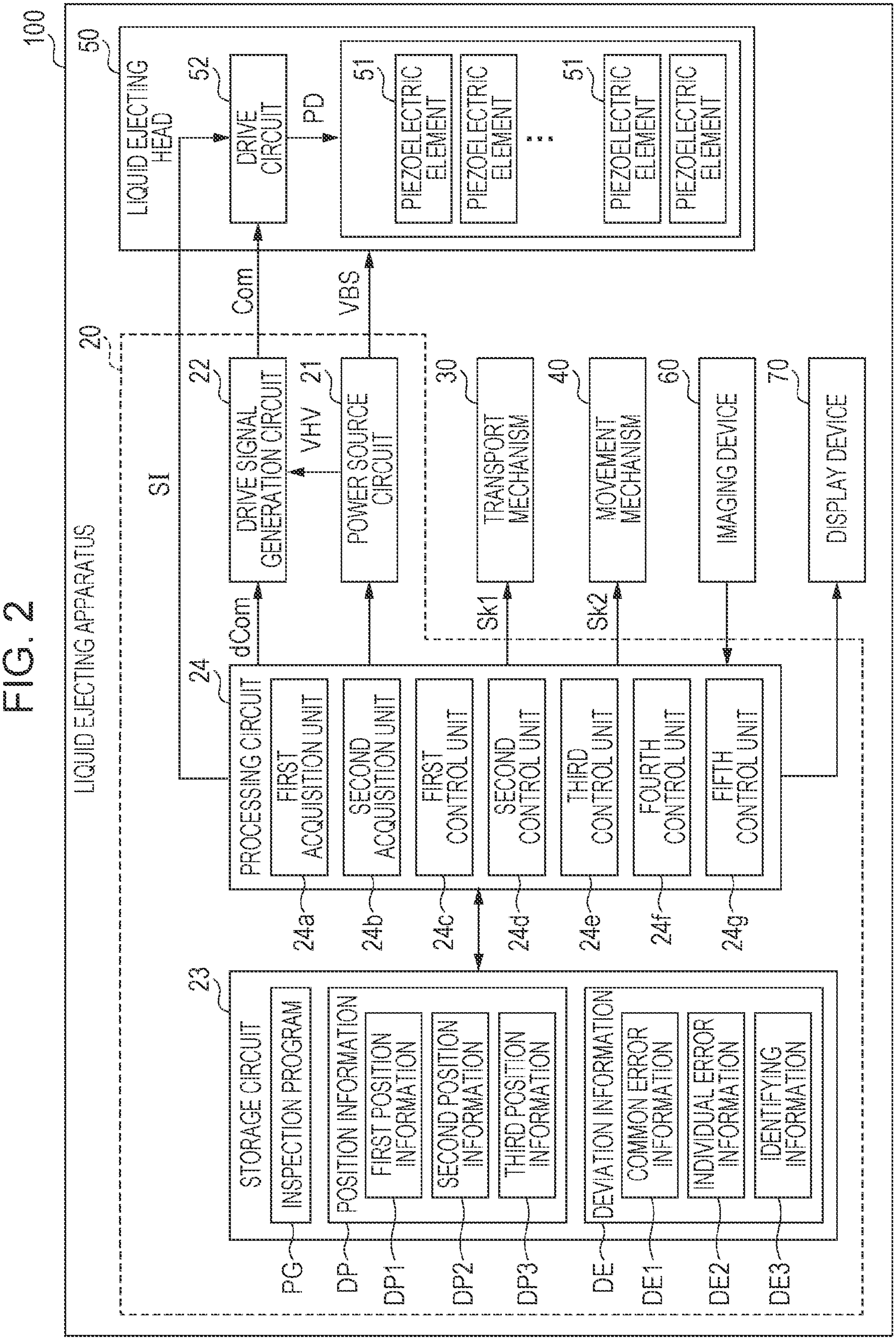
FIG. 2 is a block diagram that illustrates the electric configuration of the liquid ejecting apparatus according to the first embodiment.

FIG. 2 is a block diagram that illustrates the electric configuration of the liquid ejecting apparatus 100 according to the first embodiment. In FIG. 2, among the components of the liquid ejecting apparatus 100 described above, those that relate to its electric configuration are illustrated.

As illustrated in FIG. 2, the control unit 20 includes a power source circuit 21, a drive signal generation circuit 22, a storage circuit 23, and a processing circuit 24. The storage circuit 23 is an example of "a storage unit".

The power source circuit 21 receives supply of external power from a commercial power source that is not illustrated, and generates various voltages having predetermined levels. The various voltages generated by the power source circuit 21 are supplied to the components, etc. of the liquid ejecting apparatus 100. For example, the power source circuit 21 generates a power voltage VHV and an offset voltage VBS. The offset voltage VBS is supplied to the liquid ejecting head 50, etc. The power voltage VHV is supplied to the drive signal generation circuit 22, etc.

The drive signal generation circuit 22 is a circuit that generates a drive signal Com for driving each piezoelectric element 51 of the liquid ejecting head 50. Specifically, the drive signal generation circuit 22 includes, for example, a DA conversion circuit and an amplification circuit. In the drive signal generation circuit 22, the DA conversion circuit converts the format of a waveform specifying signal dCom supplied from the processing circuit 24 from a digital signal format into an analog signal format, and the amplification circuit generates the drive signal Com by amplifying the analog signal by using the power voltage VHV supplied from the power source circuit 21. The waveform specifying signal dCom will be described later. A signal having, of the waveform included in the drive signal Com, a waveform supplied actually to the piezoelectric element 51 serves as a drive pulse PD.

The storage circuit 23 stores various programs that are to be run by the processing circuit 24 and various kinds of data such as print data that are to be processed by the processing circuit 24. The storage circuit 23 includes, for example, one semiconductor memory that is either one of a volatile memory and a nonvolatile memory, or semiconductor memories constituted by both thereof. The volatile memory is, for example, a random-access memory (RAM), and the nonvolatile memory is, for example, a read-only memory (ROM), an electrically erasable programmable read-only memory (EEPROM), or a programmable ROM (PROM). The storage circuit 23 may be configured as a part of the processing circuit 24.

An inspection program PG, position information DP, and deviation information DE are stored in the storage circuit 23. The inspection program PG is a program that causes the control unit 20 to execute an inspection method that will be described later.

The position information DP is information about the positions of droplets ejected from a plurality of nozzles N of the liquid ejecting head 50 and traveling in air. Specifically, the position information DP includes first position information DP1, second position information DP2, and third position information DP3.

The first position information DP1 is information about the position, at a first timing, of a droplet ejected from a first nozzle, which is one of the plurality of nozzles N, and traveling in air. The second position information DP2 is information about the position, at the first timing, of a droplet ejected from a second nozzle, which is one of the plurality of nozzles N and is different from the first nozzle, and traveling in air. The third position information DP3 is information about the position, at a second timing later than the first timing, of the droplet ejected from the first nozzle and traveling in air.

In the position information DP described above, for example, as illustrated in FIG. 5, which will be described later, the position of each droplet is expressed either using the coordinate value of a real-space coordinate system or using the coordinate value of a camera coordinate system associated with the real-space coordinate system on the imaging device 60. These coordinate systems are set based on a reference plane, which will be described later, or a plane corresponding to the reference plane. The data format of the position information DP is not specifically limited. Namely, the position information DP may have any data format. The position information DP may include information about the position, at any other timing different from the first timing and different from the second timing, of the droplet traveling in air and/or information about the position of a droplet ejected from any other nozzle different from the first nozzle and different from the second nozzle and traveling in air, in addition to the first position information DP1, the second position information DP2, and the third position information DP3 described above.

The deviation information DE is information about a deviation in droplet landing position from a reference position on the reference plane, for droplets ejected from at least two nozzles among the plurality of nozzles of the liquid ejecting head 50. The reference plane is a plane set along the surface of the medium M or set along an extensional plane of it. For example, the reference plane is a plane B illustrated in FIG. 5, which will be described later. The reference plane may be the surface of the medium M, may be the surface of another object, which is not the medium M, or may be a virtual plane set in a space. The reference position is an ideal landing position of a droplet ejected from each nozzle N onto the reference plane. For example, the reference position is a position P0_*a* or a position P0_*b* illustrated in FIG. 5, which will be described later. The landing position is a position where a droplet ejected from each nozzle N actually lands onto the reference plane, or an estimated position of it. For example, the landing position is a position P1_*a* or a position P1_*b* illustrated in FIG. 5, which will be described later. In the description below, the reference position P0_*a* and the reference position P0_*b* may be referred to as "reference position P0" without making a distinction therebetween. Similarly, the landing position P1_*a* and the landing position P1_*b* may be referred to as "landing position P1" without making a distinction therebetween.

In the present embodiment, the deviation information DE includes common error information DE1, individual error information DE2, and identifying information DE3.

The common error information DE1 is information about an error that is common to any two nozzles N among the plurality of nozzles N such as an angle of inclination θ2, which will be described later. The two nozzles N mentioned here are, for example, a first nozzle N_a and a second nozzle N_b, which will be described later. An example of this error is a mount error of the liquid ejecting head 50 mounted on the carriage 41. The data format of the common error information DE1 may be any format as long as it is possible to show a relationship between the two nozzles and the error.

The individual error information DE2 is information about an error that is not common to the two nozzles N such as an angle of inclination θ1, which will be described later. An example of this error is each individual manufacturing error of the two nozzles N. The data format of the individual error information DE2 may be any format as long as it is possible to show a relationship between each of the two nozzles and the error.

The identifying information DE3 is information for identifying one nozzle N whose error indicated by the individual error information DE2 is greater than the other of the two nozzles N. The data format of the identifying information DE3 may be any format as long as it is possible to identify the nozzle N whose error is not less than a predetermined value.

In the deviation information DE described above, for example, as illustrated in FIG. 5, which will be described later, each error described above and the landing positions are expressed as amounts in the real-space coordinate system or amounts in the camera coordinate system associated with the real-space coordinate system on the imaging device 60.

The processing circuit 24 has a function of controlling the operation of each component of the liquid ejecting apparatus 100 and a function of processing various kinds of data. The processing circuit 24 includes one or more processors such as, for example, such as CPU (Central Processing Unit). Instead of the CPU or in addition to the CPU, the processing circuit 24 may include a programmable logic device such as FPGA (field-programmable gate array).

The processing circuit 24 controls the operation of each component of the liquid ejecting apparatus 100 by running a program stored in the storage circuit 23. As signals for controlling the operation of the components of the liquid ejecting apparatus 100, the processing circuit 24 generates control signals Sk1, Sk2, and SI and a waveform specifying signal dCom, etc.

The control signal Sk1 is a signal for controlling the driving of the transport mechanism 30. The control signal Sk2 is a signal for controlling the driving of the movement mechanism 40. The control signal SI is a signal for controlling the driving of the drive circuit 52. Specifically, for each predetermined unit period, the control signal SI specifies whether or not the drive circuit 52 should supply, as the drive pulse PD to the liquid ejecting head 50, the drive signal Com received from the drive signal generation circuit 22. By this means, for example, the amount of ink that is to be ejected from the liquid ejecting head 50 is specified. The waveform specifying signal dCom is a digital signal for specifying the waveform of the drive signal Com that is generated by the drive signal generation circuit 22.

Based on the control signal SI, for each of the plurality of piezoelectric elements 51, the drive circuit 52 switches whether or not to supply at least a part of the waveform included in the drive signal Com as the drive pulse PD.

The processing circuit 24 reads the inspection program PG out of the storage circuit 23 and runs the read program. By running this program, the processing circuit 24 behaves as a first acquisition unit 24*a*, a second acquisition unit 24*b*, a first control unit 24*c*, a second control unit 24*d*, a third control unit 24*e*, a fourth control unit 24*f*, and a fifth control unit 24*g*.

The first acquisition unit 24*a* has "a first acquisition function" of acquiring the position information DP. Specifically, the first acquisition unit 24*a* acquires the position information DP by using an image recognition technique, etc. based on the result of image capturing by the imaging device 60. The acquisition of the position information DP will be described in detail later with reference to FIG. 5.

The second acquisition unit 24*b* has "a second acquisition function" of acquiring, based on the position information DP, the deviation information DE. More specifically, based on the first position information DP1 and the second position information DP2, the second acquisition unit 24*b* acquires the common error information DE1. In addition, based on the first position information DP1 and the third position information DP3, the second acquisition unit 24*b* acquires the individual error information DE2. The acquisition of the deviation information DE will be described in detail later with reference to FIG. 5.

Based on the common error information DE1, the first control unit 24*c* causes the display device 70 to notify the user of information for reducing the error indicated by the common error information DE1. More specifically, for example, the first control unit 24*c* determines whether the error indicated by the common error information DE1 is not less than a predetermined value or not, and, if this error is not less than the predetermined value, the first control unit 24*c* causes the display device 70 to display a message, etc. saying that the mount state of the liquid ejecting head 50 mounted on the carriage 41 needs to be adjusted or corrected. In the present embodiment, this notification is performed by performing display by the display device 70. However, the method of the notification is not limited to display. For example, voice notification may be used.

Based on the common error information DE1, the second control unit 24*d* limits the use of the liquid ejecting head 50. More specifically, for example, the second control unit 24*d* determines whether the error indicated by the common error information DE1 is not less than a predetermined value or not, and, if this error is not less than the predetermined value, the second control unit 24*d* causes the liquid ejecting head 50 to stop. The phrase "limits the use of the liquid ejecting head 50" is a concept that includes narrowing the available range of operation of the liquid ejecting head 50, not limited to causing the liquid ejecting head 50 to stop. The use of the liquid ejecting head 50 may be permitted or prohibited depending on the type of an image that is to be printed or the required quality of an image, etc.; for example, the use of the liquid ejecting head 50 may be limited such that the printing of a high-definition image such as a photo is prohibited although the printing of a simple solid-color image is permitted.

Based on the individual error information DE2, the third control unit 24*e* causes the liquid ejecting head 50 to perform complementary droplet ejection by using another nozzle N, which is selected from among the plurality of nozzles N, in place of the nozzle N whose error indicated by the individual error information DE2 is not less than a predetermined value among the plurality of nozzles N of the liquid ejecting head 50. More specifically, the third control unit 24*e* determines for a predetermined nozzle N among the plurality of nozzles N whether or not its error indicated by the individual error information DE2 is not less than a predetermined value, and performs this determination for each of the plurality of nozzles N; then, if there exists any nozzle N whose error is not less than the predetermined value, the third control unit 24*e* causes the liquid ejecting head 50 to perform complementary droplet ejection by using another nozzle N, which is selected from among the plurality of nozzles N, instead without using this error nozzle N. In the complementary droplet ejection, the timing, etc. of ejection from said another nozzle N is adjusted such that the droplet ejected from said another nozzle N will land onto the position where the droplet from the error nozzle N that is not used were supposed to land.

Based on the individual error information DE2, the fourth control unit 24*f* causes the storage circuit 23 to store the identifying information DE3 for identifying the nozzle N whose error indicated by the individual error information DE2 is not less than a predetermined value among the plurality of nozzles N of the liquid ejecting head 50. More specifically, based on the individual error information DE2, the fourth control unit 24*f* determines for a predetermined nozzle N among the plurality of nozzles N whether or not its error indicated by the individual error information DE2 is not less than a predetermined value, performs this determination for each of the plurality of nozzles N, and causes the storage circuit 23 to store the result of this determination as the identifying information DE3.

Based on the individual error information DE2, the fifth control unit 24*g* changes the waveform of the drive pulse PD. More specifically, based on the individual error information DE2, the fifth control unit 24*g* determines for a predetermined nozzle N among the plurality of nozzles N whether or not its error indicated by the individual error information DE2 is not less than a predetermined value, and performs this determination for each of the plurality of nozzles N; then, if there exists any nozzle N whose error is not less than the predetermined value, the fifth control unit 24*g* changes the waveform of the drive pulse PD corresponding to this error nozzle N such that the error will be reduced.

1-3. Inspection Method

Figure 3:
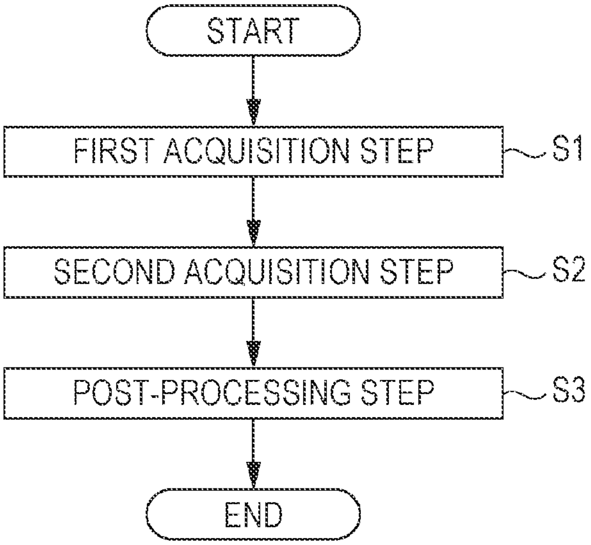
FIG. 3 is a flowchart illustrating the flow of an inspection method according to the first embodiment.

FIG. 3 is a flowchart illustrating the flow of an inspection method according to the first embodiment. The inspection method is executed using the liquid ejecting apparatus 100 described above. As illustrated in FIG. 3, the liquid ejecting apparatus 100 executes a first acquisition step S1, a second acquisition step S2, and a post-processing step S3 in this order.

In the first acquisition step S1, the position information DP is acquired. This acquisition is performed by the first acquisition unit 24*a* described above.

In the second acquisition step S2, the deviation information DE is acquired based on the position information DP. This acquisition is performed by the second acquisition unit 24*b* described above.

In the post-processing step S3, various processing based on the deviation information DE is performed. This step is executed by at least one of the first control unit 24*c*, the second control unit 24*d*, the third control unit 24*e*, the fourth control unit 24*f*, and the fifth control unit 24*g* described above. That is, in the post-processing step S3, at least one of the following kinds of processing is executed: notification by the first control unit 24*c*, use limitation by the second control unit 24*d*, complementary droplet ejection by the third control unit 24*e*, storing the identifying information DE3 by the fourth control unit 24*f*, and changing the drive pulse PD by the fifth control unit 24*g*. It suffices to execute the post-processing step S3 if needed. The post-processing step S3 may be omitted.

In the inspection method described above, based on the result of image capturing by the imaging device 60, the first acquisition unit 24*a* acquires the position information DP in the first acquisition step S1.

Figure 4:
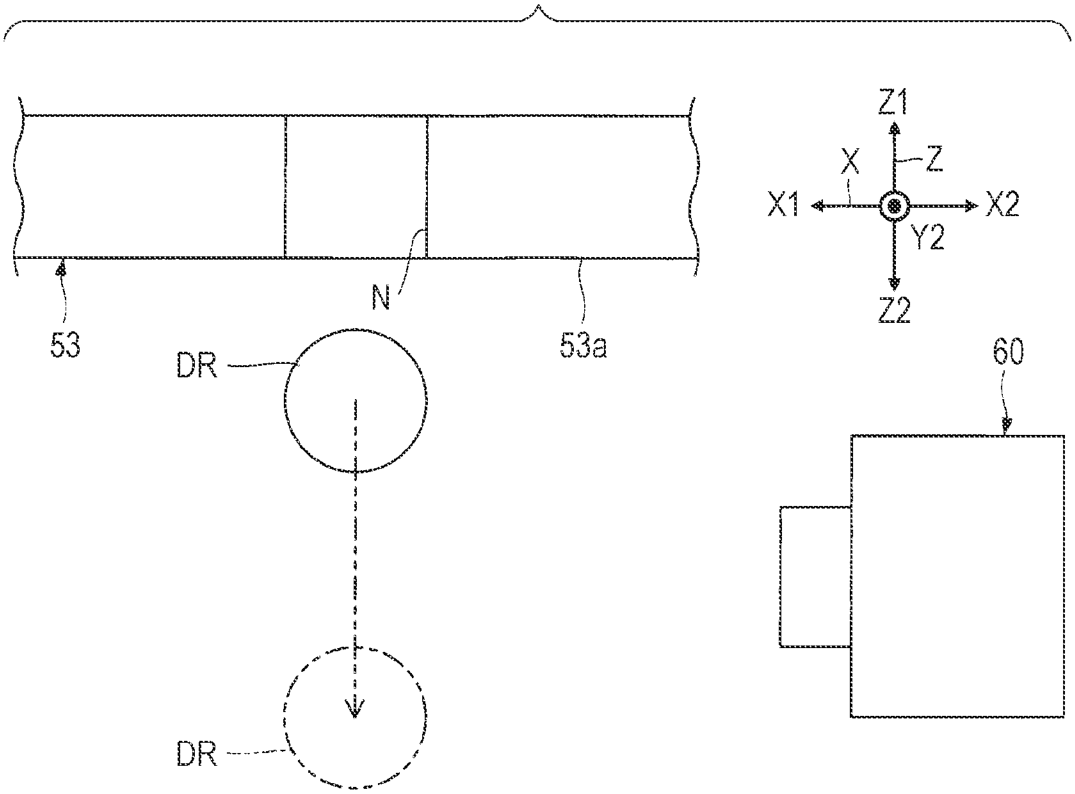
FIG. 4 is a schematic diagram for explaining an imaging unit.

FIG. 4 is a schematic diagram for explaining the imaging device 60. As illustrated in FIG. 4, the imaging device 60 captures an image of a droplet DR of ink ejected from the nozzle N of the liquid ejecting head 50 and traveling in air, in an image-capturing direction that is orthogonal to or intersects with the direction in which the droplet DR is ejected. In the present embodiment, the imaging device 60 captures the image in a direction intersecting with the Y1 direction or the Y2 direction, in which the nozzles N described earlier are arranged. In the example illustrated in FIG. 4, the image-capturing direction is the X1 direction.

In the example illustrated in FIG. 4, the liquid ejecting head 50 includes a nozzle substrate 53. The nozzle N is a through hole going from one surface to the opposite surface of the nozzle substrate 53. In ordinary installation, a nozzle surface 53*a*, which is one of these two surfaces of the nozzle substrate 53 and faces in the Z2 direction, is parallel to the print target surface of the medium M described earlier.

The droplet DR is a main droplet ejected from the nozzle N. Actually, in addition to the droplet DR, a sub droplet(s) called as a satellite, which is generated secondarily to follow the droplet DR as caused by the generation of the droplet DR, is ejected from the nozzle N. The satellite droplet is smaller in diameter than the main droplet DR. Whether the satellite droplet is generated or not, the number of droplets, the size thereof, and the like, differ depending on the type of ink, the waveform of the drive pulse PD, and the like.

The imaging device 60 captures an image of the droplet DR traveling in air either continuously or at very short capturing time intervals intermittently. Based on the result of image capturing, it is possible to measure the position of the droplet DR each at predetermined timing and to measure the ejection direction, the ejection speed, or the landing position of the droplet DR based on the positions at the plurality of timing.

However, capturing an image of a droplet DR ejected from only one nozzle N by the imaging device 60 is not enough to determine whether the measured landing position, etc. is influenced by a tilt in the mount orientation of the liquid ejecting head 50 or not when the liquid ejecting head 50, which is not supposed to be tilted, is mounted in a tilted state due to a mount error, etc.

For a solution, the liquid ejecting apparatus 100 operates as follows. The imaging device 60 image-captures droplets DR ejected from a plurality of nozzles N at predetermined capturing timing. Based on the result of image capturing, the position information DP is acquired. Then, based on the position information DP, the deviation information DE is acquired as information that makes it possible to determine whether the measured landing position, etc. is influenced by a tilt in the mount orientation of the liquid ejecting head 50 or not.

Figure 5:
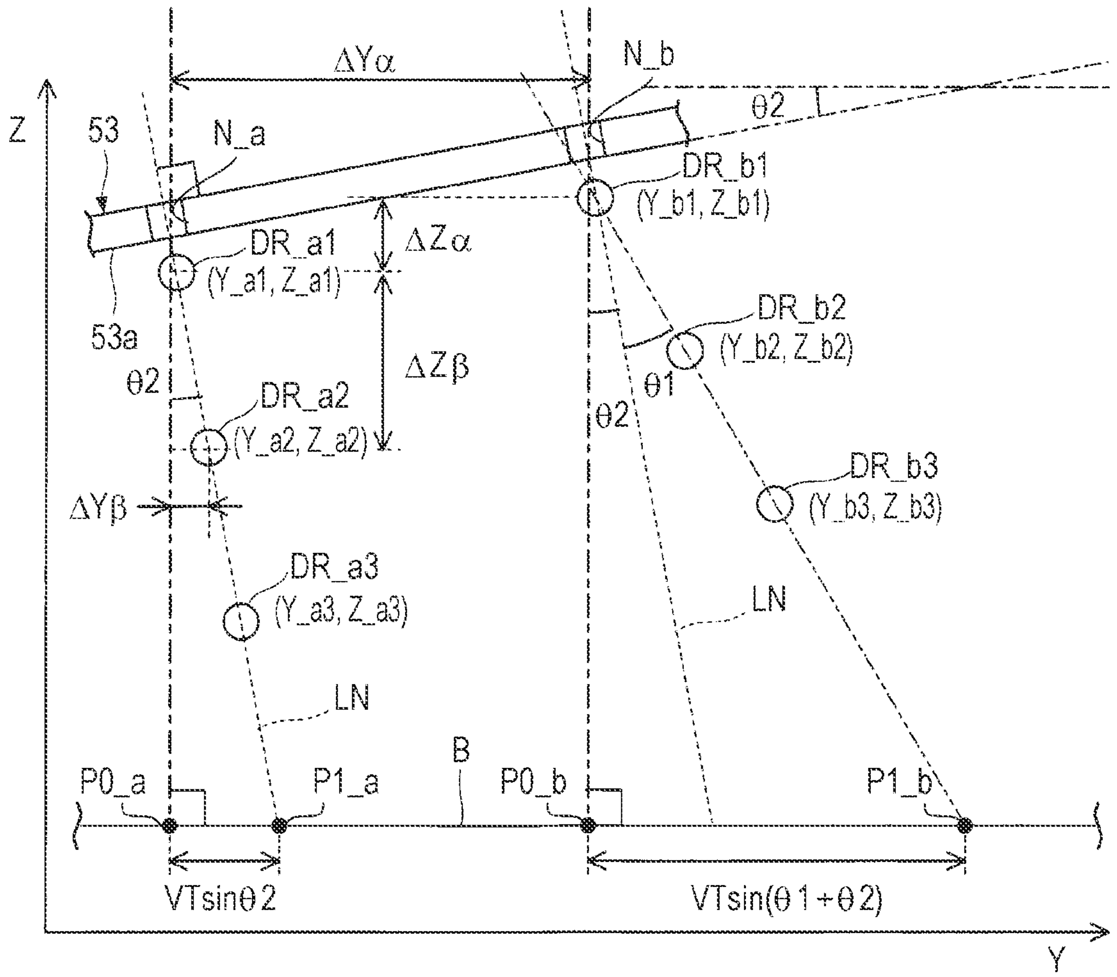
FIG. 5 is a diagram for explaining position information and deviation information.

FIG. 5 is a diagram for explaining the position information DP and the deviation information DE.

Illustrated in FIG. 5 is the state, at each timing, of the droplets DR ejected toward the reference plane B from the first nozzle N_a and the second nozzle N_b that are any two of the plurality of nozzles N of the liquid ejecting head 50. In FIG. 5, it is assumed that the ejection direction of the droplet DR ejected from the first nozzle N_a is normal, whereas the ejection direction of the droplet DR ejected from the second nozzle N_b is deviated from the normal direction. In the example illustrated in FIG. 5, the reference plane B is a plane that is perpendicular to the Z axis. In FIG. 5, for easier illustration, the first nozzle N_a and the second nozzle N_b are located next to each other. However, one or more nozzles N may exist between the first nozzle N_a and the second nozzle N_b.

Each of a droplet DR_a1, a droplet DR_a2, and a droplet DR a3 illustrated in FIG. 5 depicts the droplet DR ejected from the first nozzle N_a. The droplet DR_a1 is the droplet DR traveling in air at a first timing after having been ejected from the first nozzle N_a. The droplet DR_a2 is the droplet DR traveling in air at a second timing later than the first timing after having been ejected from the first nozzle N_a. The droplet DR a3 is the droplet DR traveling in air at a third timing later than the second timing after having been ejected from the first nozzle N_a. The droplet DR_a1, the droplet DR_a2, and the droplet DR a3 may be an identical droplet DR with different timing from one another, or may be droplets DR with different points in time of ejection from one another.

The "first timing" is a timing that is within a period from the start of applying the drive pulse PD to the piezoelectric element 51 corresponding to the nozzle N of interest to the landing of the droplet DR ejected from the nozzle N of interest onto the reference plane B, and is a timing of the lapse of predetermined time since the start of applying the drive pulse PD. In the example illustrated in FIG. 5, the "first timing" is a timing that is immediately after the ejection of the droplet DR from the nozzle N. The phrase "immediately after" mentioned here means that the time that has elapsed since the start of applying the drive pulse PD is 0.1 μs or less.

The "second timing" is a timing that is within a period from the start of applying the drive pulse PD to the piezoelectric element 51 corresponding to the nozzle N of interest to the landing of the droplet DR ejected from the nozzle N of interest onto the reference plane B, and is a timing later than the first timing of the lapse of predetermined time since the start of applying the drive pulse PD. The time interval between the first timing and the second timing is, for example, a few μs or so.

The "third timing" is a timing that is within a period from the start of applying the drive pulse PD to the piezoelectric element 51 corresponding to the nozzle N of interest to the landing of the droplet DR ejected from the nozzle N of interest onto the reference plane B, and is a timing later than the second timing of the lapse of predetermined time since the start of applying the drive pulse PD. The time interval between the second timing and the third timing is, for example, a few μs or so.

Similarly, each of a droplet DR_b1, a droplet DR_b2, and a droplet DR_b3 illustrated in FIG. 5 depicts the droplet DR ejected from the second nozzle N_b. The droplet DR_b1 is the droplet DR traveling in air at a first timing after having been ejected from the second nozzle N_b. The droplet DR_b2 is the droplet DR traveling in air at a second timing later than the first timing after having been ejected from the second nozzle N_b. The droplet DR_b3 is the droplet DR traveling in air at a third timing later than the second timing after having been ejected from the second nozzle N_b.

In the example illustrated in FIG. 5, the position of each droplet DR described above is expressed in terms of a coordinate value in an orthogonal coordinate system defined by the Y axis and the Z axis. The position of the droplet DR_a1 is expressed as a coordinate (Y_a1, Z_a1). The position of the droplet DR_a2 is expressed as a coordinate (Y_a2, Z_a2). The position of the droplet DR a3 is expressed as a coordinate (Y_a3, Z_a3). The position of the droplet DR_b1 is expressed as a coordinate (Y_b1, Z_b1). The position of the droplet DR_b2 is expressed as a coordinate (Y_b2, Z_b2). The position of the droplet DR_b3 is expressed as a coordinate (Y_b3, Z_b3).

The angle of inclination θ2 of the nozzle surface 53*a* with respect to the reference plane B is calculated based on the positions at the same timing of droplets DR ejected from two nozzles different from one another. For example, the angle of inclination θ2 is calculated using the following relational expression (1):

$$\tan\theta 2=(\Delta Z\alpha/\Delta Y\alpha) \quad (1),$$

where ΔZα is |Z_b1−Z_a1|, and ΔYα is |Y_b1−Y_a1|.

The angle of inclination θ1 of the actual ejection direction of the droplet DR with respect to the ideal ejection direction thereof, namely, the angle formed by a normal line LN that is normal to the nozzle surface 53*a* and a straight line going in the actual ejection direction, is calculated based on the positions at two different timing of the droplet DR ejected from the identical nozzle N. For example, the angle of inclination θ1 is calculated using the following relational expression (2):

$$\tan(\theta 1+\theta 2)=(\Delta Z\beta/\Delta Y\beta) \quad (2),$$

where, for the first nozzle N_a, ΔZβ is |Z_a2−Z_a1|, and ΔYβ is |Y_a2−Y_a1|, and, for the second nozzle N_b, ΔZβ is |Z_b2−Z_b1|, and ΔYβ is |Y_b2−Y_b1|. In FIG. 5, ΔZβ and ΔYβ for the first nozzle N_a are illustrated. It should be noted that ΔYβ and ΔZβ are not limited to a difference between the position at the first timing and the position at the second timing. For example, ΔYβ and ΔZβ may be a difference between the position at the first timing and the position at the third timing or a difference between the position at the second timing and the position at the third timing.

The amount of deviation in the landing position P1 of the droplet DR from the reference position P0 on the reference plane B can be expressed as VT sin(θ1+θ2). In this expression, V denotes the initial velocity of the droplet DR having been ejected. In this expression, T denotes the length of time from the ejection of the droplet DR from the nozzle N to the landing of the droplet DR onto the reference plane B. To be exact, due to a tilt, there is a difference between the distance to the reference plane B in the Z direction for the first nozzle N_a and the distance to the reference plane B in the Z direction for the second nozzle N_b and, therefore, there is a difference between the length of time T taken for the first nozzle N_a and the length of time T taken for the second nozzle N_b. However, the difference between the length of time T taken for the first nozzle N_a and the length of time T taken for the second nozzle N_b is negligible because, actually, the distance between the liquid ejecting head 50 and the medium M in the Z direction is set to be very short. Since gravitational acceleration does not act on the droplet DR in the horizontal direction, for the first nozzle N_a, the ejection direction of the droplet DR is normal and, accordingly, the amount of deviation in the landing position P1_*a* from the reference position P0_*a* can be calculated by VT sin θ2, which is a product of V sin θ2 and the length of time T, wherein V sin θ2 is the Y-directional component of the initial velocity of the ejection from the first nozzle N_a. By contrast, for the second nozzle N_b, the ejection direction of the droplet DR is deviated from the normal direction and, therefore, the amount of deviation in the landing position P1_*b* from the reference position P0_*b* can be calculated by VT sin(θ1+θ2), which is a product of V sin(θ1+θ2) and the length of time T, wherein V sin(θ1+θ2) is the Y-directional component of the initial velocity of the ejection from the second nozzle N_b.

As will be understood from the above description, in the first acquisition step S1, information about the positions of the droplets DR needed for calculating the angle of inclination θ1 and the angle of inclination θ2 described above is acquired as the position information DP. In the second acquisition step S2, based on the position information DP, the angle of inclination θ1 and the angle of inclination θ2 are calculated, and the deviation information DE is acquired using the calculation results.

As explained above, the liquid ejecting apparatus 100 includes the liquid ejecting head 50, the first acquisition unit 24*a*, and the second acquisition unit 24*b*. In the liquid ejecting head 50, the plural nozzles N from which ink, as an example of "a liquid", is ejected in the form of droplets DR are arranged. The first acquisition unit 24*a* acquires the position information DP about the positions of the droplets DR ejected from the plurality of nozzles N and traveling in air. Based on the position information DP, the second acquisition unit 24*b* acquires, for droplets DR ejected from at least two nozzles among the plurality of nozzles N, the deviation information DE about a deviation in the landing position P1 of the droplet DR from the reference position P0 on the reference plane B.

The position information DP includes the first position information DP1 and the second position information DP2. The first position information DP1 is information about the position, at the first timing, of the droplet DR ejected from the first nozzle N_a, which is one of the plurality of nozzles N, and traveling in air. The second position information DP2 is information about the position, at the first timing, of the droplet DR ejected from the second nozzle N_b, which is one of the plurality of nozzles N and is different from the first nozzle N_a, and traveling in air.

In the liquid ejecting apparatus 100 described above, the position information DP includes the first position information DP1 and the second position information DP2 as information about the positions at the same timing of droplets DR ejected from two nozzles different from one another. Therefore, based on the first position information DP1 and the second position information DP2, it is possible to measure a state such as the angle of inclination θ2 caused by an error such as a mount error of the liquid ejecting head 50. This kind of error is common to the plurality of nozzles N. Therefore, by using the measurement result based on the first position information DP1 and the second position information DP2, it is possible to tell whether the deviation in the landing position P1 of the droplet DR is unique to the particular nozzle N or is common to the plurality of nozzles N. Consequently, suitably for the cause of the deviation in the landing position P1 of the droplet DR, it is possible to perform processing for improving the quality of an image. For the reason explained above, as compared with related art, it is possible to make the burden of processing performed by the system of the liquid ejecting apparatus 100 lighter, and it is possible to correct the deviation in the landing position P1 more accurately.

As described earlier, the deviation information DE includes the common error information DE1, which is information about an error that is common to the first nozzle N_a and the second nozzle N_b. Therefore, based on the common error information DE1, it is possible to determine whether an error that is common to the plurality of nozzles N has occurred or not.

As described earlier, the liquid ejecting apparatus 100 further includes the carriage 41, which is an example of "a mounting unit" on which the liquid ejecting head 50 is mounted. The common error information DE1 includes information about a mount error of the liquid ejecting head 50 mounted on the carriage 41. Therefore, based on the common error information DE1, it is possible to determine whether there is a mount error of the liquid ejecting head 50 mounted on the carriage 41 or not, or, if there is such a mount error, it is possible to determine the degree of the mount error.

As described earlier, based on the difference ΔZα and the difference ΔYα, the second acquisition unit 24*b* acquires the common error information DE1. In the present embodiment, the difference ΔZα is the difference between the position Z_a1 indicated by the first position information DP1 and the position Z_b1 indicated by the second position information DP2 in the Z1 direction or the Z2 direction, which is orthogonal to the reference plane B. The difference ΔYα is the difference between the position Y_a1 indicated by the first position information DP1 and the position Y_b1 indicated by the second position information DP2 in the Y1 direction or the Y2 direction, which is parallel to the reference plane B. It is possible to calculate the angle of inclination θ2 of the liquid ejecting head 50 by using a trigonometric function based on these differences.

The common error information DE1 described above is used for various kinds of processing in the liquid ejecting apparatus 100 when needed. In the present embodiment, as described earlier, the liquid ejecting apparatus 100 further includes the display device 70, which is an example of "a notification unit", and the first control unit 24*c*. Based on the common error information DE1, the first control unit 24*c* causes the display device 70 to notify the user of information about a mount state of the liquid ejecting head 50. Therefore, it is possible to prompt the user to adjust or correct the mount state of the liquid ejecting head 50 as the need dictates. Some examples of the information notified by the display device 70 are: information that shows the mount error of the liquid ejecting head 50 quantitatively or qualitatively, information for informing the user that the mount state of the liquid ejecting head 50 needs to be adjusted or corrected, information for informing the user that printing is canceled/aborted or restricted due to the mount error of the liquid ejecting head 50, and the like.

As described earlier, the liquid ejecting apparatus 100 further includes the second control unit 24*d*. Based on the common error information DE1, the second control unit 24*d* limits the use of the liquid ejecting head 50. Therefore, it is possible to reduce wasteful ink ejection.

As described earlier, the position information DP includes the third position information DP3, which is information about the position, at the second timing later than the first timing, of the droplet DR ejected from the first nozzle N_a and traveling in air. Therefore, by using the first position information DP1 and the third position information DP3, it is possible to calculate the deviation in the landing position P1 of the droplet DR ejected from the first nozzle N_a.

Therefore, it is possible to acquire the deviation information DE that includes information about the deviation by the second acquisition unit 24*b*.

As described earlier, the deviation information DE includes the individual error information DE2, which is information about an error that is not common to the first nozzle N_a and the second nozzle N_b. Based on the first position information DP1 and the third position information DP3, the second acquisition unit 24*b* acquires the individual error information DE2.

As described earlier, the individual error information DE2 is information about a manufacturing error of the first nozzle N_a or the second nozzle N_b. Therefore, based on the individual error information DE2, it is possible to determine whether there is a manufacturing error of the first nozzle N_a or not, there is a manufacturing error of the second nozzle N_b or not, or, if there is such a manufacturing error, it is possible to determine the degree of the manufacturing error.

As described earlier, based on the difference $\Delta Z\beta$ and the difference $\Delta Y\beta$, the second acquisition unit 24*b* acquires the individual error information DE2. The difference $\Delta Z\beta$ is the difference between the position Z_a1 indicated by the first position information DP1 and the position Z_a2 indicated by the third position information DP3 in the Z1 direction or the Z2 direction, which is orthogonal to the reference plane B. The difference $\Delta Y\beta$ is the difference between the position Y_a1 indicated by the first position information DP1 and the position Y_a2 indicated by the third position information DP3 in the Y1 direction or the Y2 direction, which is parallel to the reference plane B. It is possible to calculate the angle of inclination $\theta 1$ of the ejection direction of the droplet DR ejected from the first nozzle N_a by using a trigonometric function based on these differences. The angle of inclination $\theta 1$ is an angle formed by the normal line LN, which is normal to the nozzle surface 53*a*, and the ejection direction of the droplet DR ejected from the liquid ejecting head 50.

In the present embodiment, as described earlier, the first timing is a timing that is immediately after the ejection of the droplet DR from the first nozzle N_a or the second nozzle N_b. Therefore, the droplet DR ejected from the first nozzle N_a or the second nozzle N_b is not susceptible to the influence of an airflow, etc. till reaching the first timing, and, moreover, the angle of inclination $\theta 2$ will have almost no influence on the position of the droplet DR. Advantageously, this makes it easier to increase the precision of the deviation information DE.

The individual error information DE2 described above is used for various kinds of processing in the liquid ejecting apparatus 100 when needed. In the present embodiment, as described earlier, the liquid ejecting apparatus 100 further includes the third control unit 24*e*. Based on the individual error information DE2, the third control unit 24*e* causes the liquid ejecting head 50 to eject a droplet DR that serves as a complement by using another nozzle N, which is selected from among the plurality of nozzles N, in place of either one of the first nozzle N_a and the second nozzle N_b whose error indicated by the individual error information DE2 is greater than the other. Therefore, it is possible to suppress a decrease in image quality ascribable uniquely to the nozzle N for which the deviation in the landing position P1 occurs.

As described earlier, the liquid ejecting apparatus 100 further includes the storage circuit 23, which is an example of "a storage unit", and the fourth control unit 24*f*. Based on the individual error information DE2, the fourth control unit 24*f* causes the storage circuit 23 to store the identifying information DE3 for identifying either one of the first nozzle N_a and the second nozzle N_b whose error indicated by the individual error information DE2 is greater than the other. Therefore, based on the identifying information DE3 stored in the storage circuit 23, it is possible to identify the unique nozzle N for which the deviation in the landing position P1 occurs.

As described earlier, the liquid ejecting apparatus 100 further includes the fifth control unit 24*g*. Based on the individual error information DE2, the fifth control unit 24*g* changes the waveform of the drive pulse PD for driving the liquid ejecting head 50. Therefore, it is possible to suppress a decrease in image quality ascribable uniquely to the nozzle N for which the deviation in the landing position P1 occurs.

As described earlier, the liquid ejecting apparatus 100 further includes the imaging device 60, which is an example of "an imaging unit". The imaging device 60 captures an image of the droplet DR ejected from the liquid ejecting head 50 and traveling in air, in an image-capturing direction that is parallel to the reference plane B and is orthogonal to the direction in which the plurality of nozzles N are arranged. The image-capturing direction in the present embodiment is orthogonal to the direction in which the medium M is transported. Based on the result of image capturing by the imaging device 60, the first acquisition unit 24*a* acquires the position information DP. Therefore, it is possible to acquire the position information DP in a suitable manner.

2. Second Embodiment

A second embodiment of the present disclosure will now be explained. In the exemplary embodiment described below, the same reference numerals as those used in the description of the first embodiment are assigned to elements that are the same in operation or function as those in the first embodiment, and a detailed explanation of them is omitted.

Figure 6:
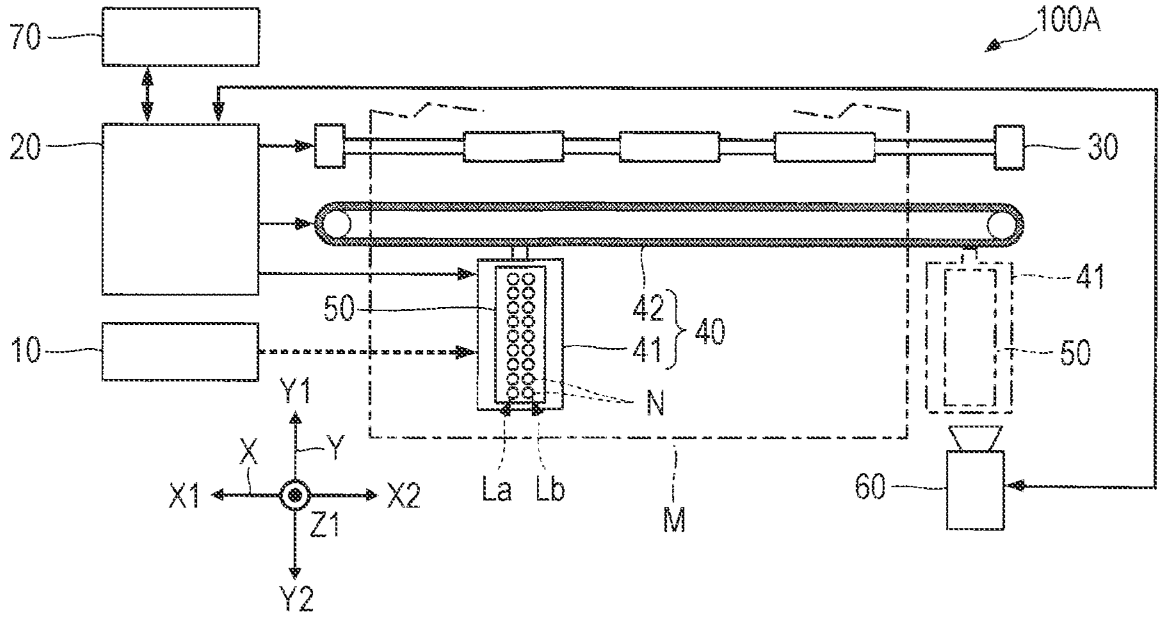
FIG. 6 is a schematic view of the configuration of a liquid ejecting apparatus according to a second embodiment.

FIG. 6 is a schematic view of the configuration of a liquid ejecting apparatus 100A according to a second embodiment. Except for a difference in the position and orientation of the imaging device 60, the liquid ejecting apparatus 100A is the same as the liquid ejecting apparatus 100 according to the first embodiment described earlier.

In the present embodiment, the imaging device 60 performs image capturing in a direction that is along the array of the plurality of nozzles N described earlier. In the example illustrated in FIG. 6, the image-capturing direction is the Y1 direction. In this image capturing performed by the imaging device 60, a nozzle N in one of the rows La and Lb corresponds to the first nozzle, and a nozzle N in the other of the rows La and Lb corresponds to the second nozzle.

Even if configured as disclosed in the second embodiment above, similarly to the first embodiment described earlier, as compared with related art, the present disclosure makes it possible to make the burden of processing performed by the system of the liquid ejecting apparatus 100 lighter, and it is possible to correct the deviation in the landing position P1 more accurately.

3. Third Embodiment

A third embodiment of the present disclosure will now be explained. In the exemplary embodiment described below, the same reference numerals as those used in the description of the first embodiment are assigned to elements that are the same in operation or function as those in the first embodiment, and a detailed explanation of them is omitted.

Figure 7:
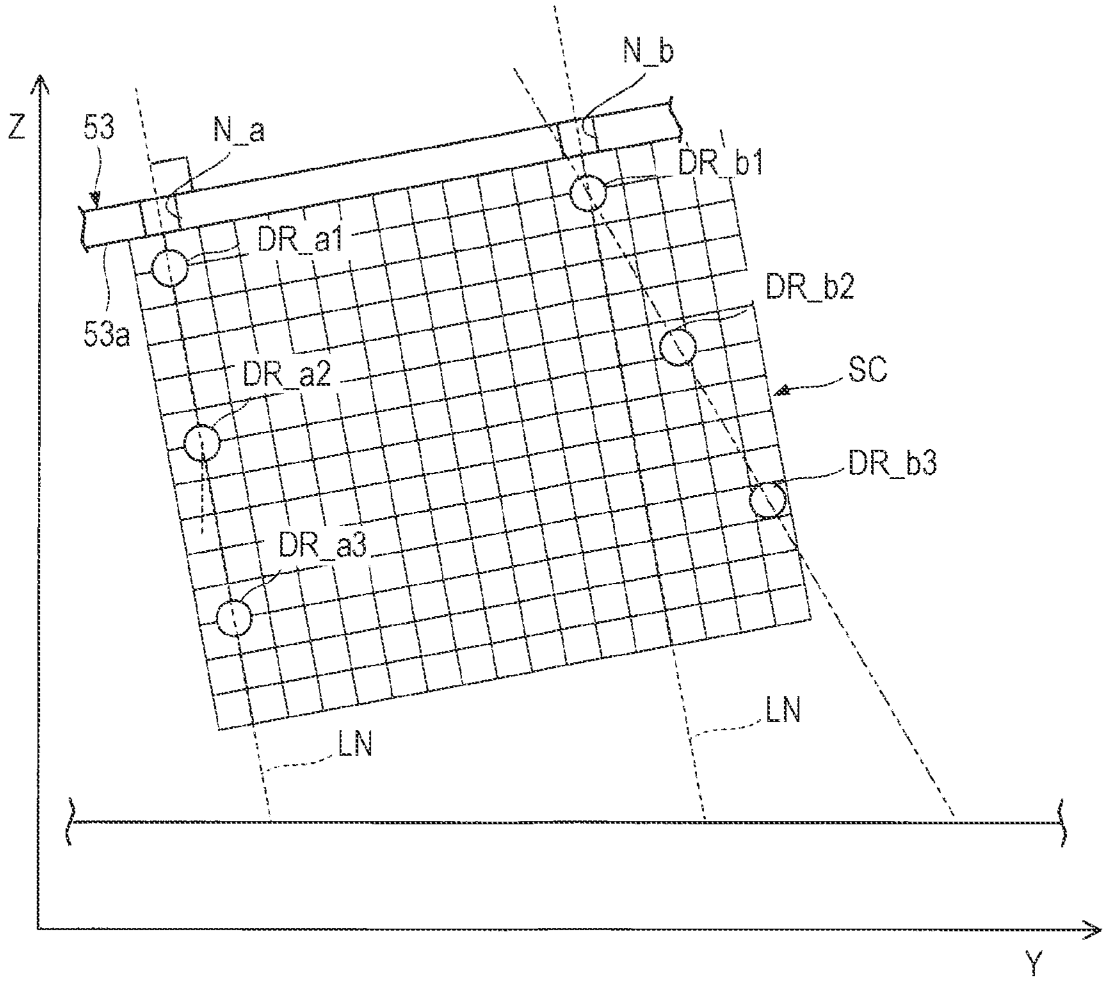
FIG. 7 is a diagram for explaining an inspection method according to a third embodiment.

FIG. 7 is a diagram for explaining an inspection method according to a third embodiment. The present embodiment is the same as the first embodiment described earlier, except that a reference device SC is provided behind droplets DR the images of which are to be captured.

The reference device SC has scales set based on the nozzle surface 53*a*. In the example illustrated in FIG. 7, the reference device SC has a plurality of ruler lines perpendicular to the nozzle surface 53*a* and a plurality of ruler lines parallel to the nozzle surface 53*a*. These ruler lines constitute a pattern made up of a plurality of squares like a grid sheet. By using the reference device SC described here, it is possible to know the angle of inclination θ1 based on the result of image capturing by the imaging device 60, without any need for computing the mount orientation of the liquid ejecting head 50.

Even if configured as disclosed in the third embodiment above, similarly to the first embodiment described earlier, as compared with related art, the present disclosure makes it possible to make the burden of processing performed by the system of the liquid ejecting apparatus 100 lighter, and it is possible to correct the deviation in the landing position P1 more accurately. The form, pattern, etc. of the reference device SC is not limited to the example illustrated in FIG. 7. For example, the reference device SC may be like an L-shaped ruler or a protractor.

4. Modification Example

The embodiments described as examples above can be modified in various ways. Some specific examples of modification that can be applied to the embodiments described above are described below. Any two or more modification examples selected from the description below may be combined as long as they are not contradictory to each other or one another.

4-1. First Modification Example

In the foregoing embodiments, each of a first driving element and a second driving element is disclosed as a piezoelectric element. However, the structure of the present disclosure is not limited to such an example. Each of the first driving element and the second driving element may be a heater. That is, the liquid ejecting head is not limited to a piezoelectric-type head, and may be a thermal-type head.

4-2. Second Modification Example

In the foregoing embodiments, the liquid ejecting apparatus 100 that is a so-called serial-type liquid ejecting apparatus configured to reciprocate the carriage 41 on which the liquid ejecting head 50 is mounted has been described as examples. However, the present disclosure may be applied to a so-called line-type liquid ejecting apparatus in which the plural nozzles N are arranged throughout the entire width of the medium M.

4-3. Third Modification Example

The liquid ejecting apparatus 100 disclosed as examples in the foregoing embodiments can be applied to not only print-only machines but also various kinds of equipment such as facsimiles and copiers, etc. The scope of application and use of the liquid ejecting apparatus according to the present disclosure is not limited to printing. For example, a liquid ejecting apparatus that ejects a colorant solution can be used as an apparatus for manufacturing a color filter of a liquid crystal display device. A liquid ejecting apparatus that ejects a solution of a conductive material can be used as a manufacturing apparatus for forming wiring lines and electrodes of a wiring substrate. Moreover, the liquid ejecting apparatus of the present disclosure can be used as a 3D printer, used for compounding small amounts of chemical or medical agents, used for cell culturing, used for vaccine production, and so forth.

In the foregoing embodiments, no distinction is made between the drive pulse PD that is applied when a liquid is ejected for executing the inspection method illustrated in FIG. 3 and the drive pulse PD that is applied when a liquid is ejected for printing a real image. However, the drive pulse PD applied for inspection may be configured to be a unique pulse suited for inspection. For example, when an inspection is conducted, the drive pulse PD that applies pressure to a liquid to an extent that a meniscus will not be in contact with the exit of an orifice of the nozzle surface may be used. In other words, this drive pulse PD is a drive pulse for ejecting a very small amount of a liquid, smaller than that of real image printing, having a diameter smaller than the internal diameter of a nozzle. If the drive pulse PD described here is used, it is possible to eject a liquid without being influenced by the wettability (critical surface tension) of the nozzle surface. Therefore, it is possible to inspect a deviation in landing position regardless of a difference in wettability.

What is claimed is:

1. A liquid ejecting apparatus, comprising:

a liquid ejecting head in which a plurality of nozzles for ejecting a liquid as droplets are arranged;

a first acquisition unit that acquires position information about positions of droplets ejected from the plurality of nozzles and traveling in air; and a second acquisition unit that acquires, based on the position information, deviation information about a deviation in droplet landing position from a reference position on a reference plane, for droplets ejected from at least two nozzles among the plurality of nozzles; wherein the position information includes first position information about a position, at a first timing, of a droplet ejected from a first nozzle, which is one of the plurality of nozzles, and traveling in air, and second position information about a position, at the first timing, of a droplet ejected from a second nozzle, which is one of the plurality of nozzles N and is different from the first nozzle, and traveling in air.

2. The liquid ejecting apparatus according to claim 1, wherein the deviation information includes common error information about an error that is common to the first nozzle and the second nozzle.

3. The liquid ejecting apparatus according to claim 2, further comprising:

a mounting unit on which the liquid ejecting head is mounted; wherein the common error information includes information about a mount error of the liquid ejecting head mounted on the mounting unit.

4. The liquid ejecting apparatus according to claim 2, wherein based on a difference between a position indicated by the first position information and a position indicated by the second position information in a direction orthogonal to the reference plane and a difference between a position indicated by the first position information and a position indicated by the second position information in a direction parallel to the reference plane, the second acquisition unit acquires the common error information.

5. The liquid ejecting apparatus according to claim 2, further comprising:

a first control unit that causes, based on the common error information, a notification unit to perform notification of information about a mount state of the liquid ejecting head.

6. The liquid ejecting apparatus according to claim 2, further comprising:

a second control unit that limits, based on the common error information, use of the liquid ejecting head.

7. The liquid ejecting apparatus according to claim 1, wherein the position information further includes third position information about a position, at a second timing later than the first timing, of the or a droplet ejected from the first nozzle and traveling in air.

8. The liquid ejecting apparatus according to claim 7, wherein the deviation information includes individual error information about an error that is not common to the first nozzle and the second nozzle, and based on the first position information and the third position information, the second acquisition unit acquires the individual error information.

9. The liquid ejecting apparatus according to claim 8, wherein the individual error information is information about a manufacturing error of the first nozzle or the second nozzle.

10. The liquid ejecting apparatus according to claim 8, wherein based on a difference between a position indicated by the first position information and a position indicated by the third position information in a direction orthogonal to the reference plane and a difference between a position indicated by the first position information and a position indicated by the third position information in a direction parallel to the reference plane, the second acquisition unit acquires the individual error information.

11. The liquid ejecting apparatus according to claim 8, wherein the first timing is a timing that is immediately after ejection of the droplet from the first nozzle or the second nozzle.

12. The liquid ejecting apparatus according to claim 8, further comprising:

a third control unit that causes, based on the individual error information, the liquid ejecting head to perform complementary droplet ejection by using another nozzle, which is selected from among the plurality of nozzles, in place of either one of the first nozzle and the second nozzle whose error indicated by the individual error information is greater than the other.

13. The liquid ejecting apparatus according to claim 8, further comprising:

a fourth control unit that causes, based on the individual error information, a storage unit to store identifying information for identifying either one of the first nozzle and the second nozzle whose error indicated by the individual error information is greater than the other.

14. The liquid ejecting apparatus according to claim 8, further comprising:

a fifth control unit that changes, based on the individual error information, a waveform of a drive pulse for driving the liquid ejecting head.

15. The liquid ejecting apparatus according to claim 1, further comprising:

an imaging unit that captures an image of the droplet ejected from the liquid ejecting head and traveling in air, in an image-capturing direction that is parallel to the reference plane and is orthogonal to a direction in which the plurality of nozzles are arranged; wherein based on a result of image capturing by the imaging unit, the first acquisition unit acquires the position information.

16. An inspection method for inspecting a liquid ejecting head in which a plurality of nozzles for ejecting a liquid as droplets are arranged, comprising:

a first acquisition step of acquiring, as position information about positions of droplets ejected from the plurality of nozzles and traveling in air, first position information about a position, at a first timing, of a droplet ejected from a first nozzle, which is one of the plurality of nozzles, and traveling in air, and second position information about a position, at the first timing, of a droplet ejected from a second nozzle, which is one of the plurality of nozzles N and is different from the first nozzle, and traveling in air; and a second acquisition step of acquiring, based on the position information, deviation information about a deviation in droplet landing position from a reference position on a reference plane, for droplets ejected from at least two nozzles among the plurality of nozzles.

17. A non-transitory computer-readable storage medium storing an inspection program for inspecting a liquid ejecting head in which a plurality of nozzles for ejecting a liquid as droplets are arranged, the inspection program causing a computer to execute functions comprising:

a first acquisition function of acquiring, as position information about positions of droplets ejected from the plurality of nozzles and traveling in air, first position information about a position, at a first timing, of a droplet ejected from a first nozzle, which is one of the plurality of nozzles, and traveling in air, and second position information about a position, at the first timing, of a droplet ejected from a second nozzle, which is one of the plurality of nozzles N and is different from the first nozzle, and traveling in air; and a second acquisition function of acquiring, based on the position information, deviation information about a deviation in droplet landing position from a reference position on a reference plane, for droplets ejected from at least two nozzles among the plurality of nozzles.

* * * * *